United States Patent [19]

Faulstich et al.

[11] 4,225,459
[45] Sep. 30, 1980

[54] GLASSES HAVING A LOW NON-LINEAR REFRACTIVE INDEX FOR LASER APPLICATIONS

[75] Inventors: Marga Faulstich, Mainz; Walter Jahn, Ingelheim; Georg Krolla, Mainz; Norbert Neuroth, Mainz-Mombach, all of Fed. Rep. of Germany

[73] Assignee: JENAer Glaswerk Schott & Gen., Mainz, Fed. Rep. of Germany

[21] Appl. No.: 897,482

[22] Filed: Apr. 18, 1978

[30] Foreign Application Priority Data

Apr. 22, 1977 [DE] Fed. Rep. of Germany ....... 2717916

[51] Int. Cl.$^2$ ............ C03C 3/12; C03C 3/16; C09K 11/08; H01S 3/17
[52] U.S. Cl. .................... 252/301.4 P; 106/47 Q; 331/94.5 E
[58] Field of Search ............. 106/47 Q, 47 R; 252/301.4 P, 301.4 H, 301.4 F, 301.4 R; 331/94.5 E

[56] References Cited

U.S. PATENT DOCUMENTS

| | | | |
|---|---|---|---|
| 3,960,578 | 6/1976 | Krolla | 106/47 Q |
| 4,040,846 | 8/1977 | Broemer et al. | 106/47 Q |
| 4,075,120 | 2/1978 | Myers et al. | 252/301.4 P |
| 4,120,814 | 10/1978 | Izumitani et al. | 252/301.4 P |
| 4,142,986 | 3/1979 | Rapp | 252/301.4 P |

FOREIGN PATENT DOCUMENTS

| | | | |
|---|---|---|---|
| 2304582 | 10/1976 | France | 106/47 Q |
| 781243 | 8/1957 | United Kingdom | 106/47 R |
| 1405717 | 9/1975 | United Kingdom | 106/47 Q |
| 447379 | 8/1975 | U.S.S.R. | 106/47 Q |

OTHER PUBLICATIONS

Laser Program Annual Report–1975–Lawrence Livermore Laboratory–V. of Calif.–pub. Mar. 1976, pp. 197–202–Copyin Group 220.
Weber, M. J. et al., "Low-Index Fluoride Glasses for HIgh Power Neodymium Lasers", Optics Communications 18 (1) (Jul. 1976), pp. 171–172.

*Primary Examiner*—Helen M. McCarthy
*Attorney, Agent, or Firm*—Haight, Rosfeld, Noble & Santa Maria

[57] ABSTRACT

Glass composition ranges are described which permit the introduction of laser activators into fluorphosphate glass with exceptionally high fluorine content while forming glasses of high crystallization stability and permitting the realization of large melt volumes. The high fluorine content imparts to the glasses an exceptionally low nonlinear refractive index $n_2$ down to $0,4 \times 10^{-13}$ esu.

6 Claims, 1 Drawing Figure

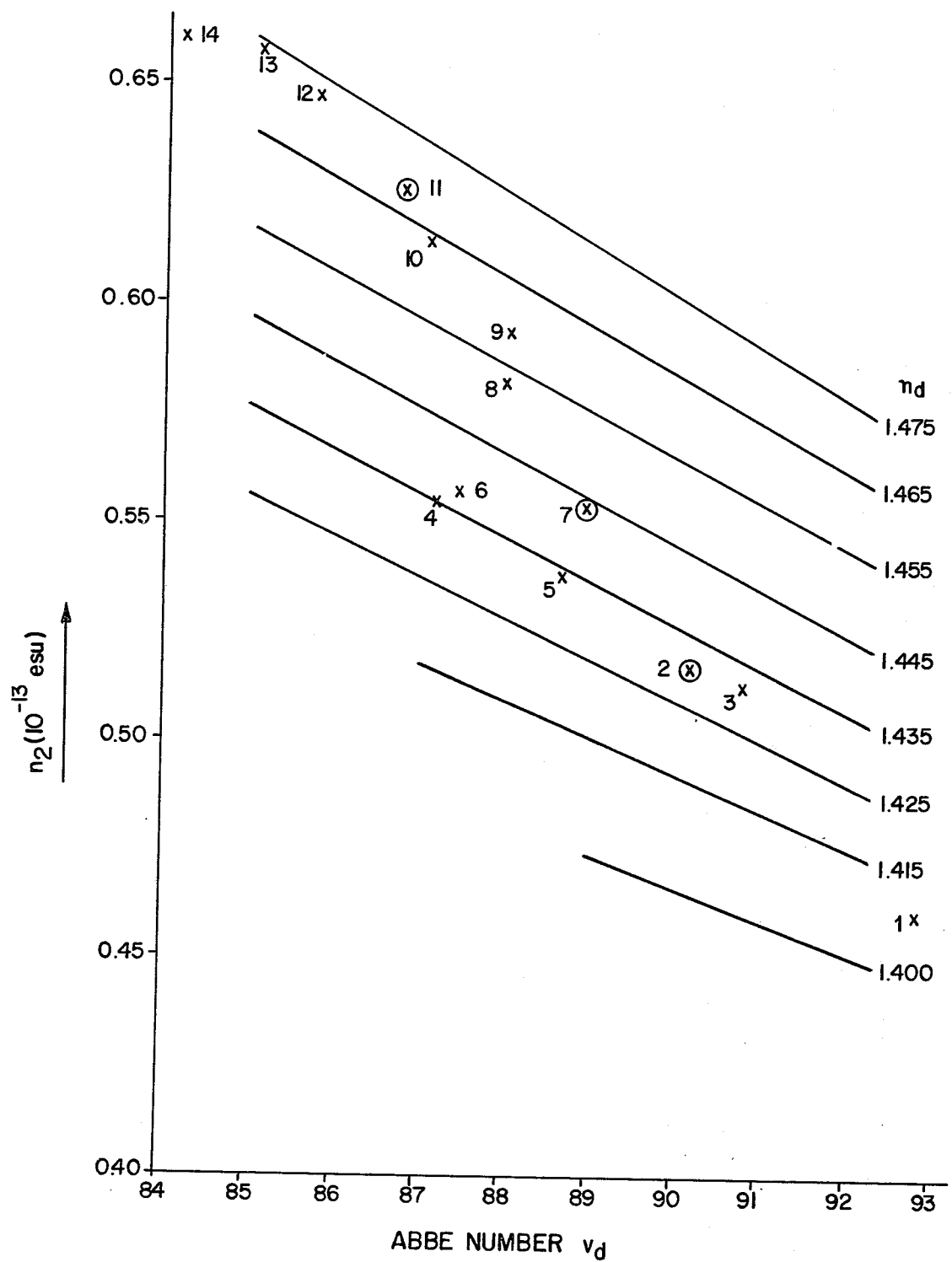

GLASSES HAVING A LOW NON-LINEAR REFRACTIVE INDEX FOR LASER APPLICATIONS

BACKGROUND OF THE INVENTION

The invention relates to new glasses which are particularly suitable for solid state laser amplifier applications.

The most powerful coherent light impulses hitherto known are generated by solid state lasers, in which the impulse of a pilot laser is amplified through a chain of amplifier stages. Such an amplifier stage primarily comprises a laser glass rod containing an effective amount of activator ions, e.g. $Nd^{3+}$, which are excited to fluorescence by the light of flashlamps. This energy of excitation is surrendered by induced emission to the laser beam as it travels through the rod. After passing through a large number of such amplifiers, the radiation intensity can become so great that the resulting high electric field intensity displaces the electrons in the shell of the atoms of the glass so strongly that the refractive index is thereby increased.

In electric fields of moderate intensity, the dielectric displacement is proportional to the electric field intensity:

$$D = \epsilon E$$

wherein:
 D = dielectric displacement
 E = electric field strength
 $\epsilon$ = dielectric constant.

For extremely high electric field intensities, this linear relationship no longer applies and a quadratic relationship appears:

$$D = \epsilon E + \epsilon_2 E^2$$

The root $\sqrt{\epsilon_2} = n_2$ is a measure of a so-called "non-linear effect." The quantity $n_2$ is therefore called the non-linear refractive index and is expressed in electrostatic units. Increasing the refractive index causes a focussing of the beam. The intensity is greatest in the interior of the beam cross-section and diminishes towards the marginal zone of the beam cross-section. The non-linear refractive index also has a corresponding distribution and a convex lens effect is also obtained by this means. It is important that the glass which is used in the amplifier stages should have a low non-linear refractive index in order that self-focussing does not become so intense that an electric discharge is generated in the glass, which would destroy it. The glasses of which are made the lenses for beam spreading or beam focussing, as well as the plates which are present in the beam path in order to reflect out a small part of the laser beam for measurements, must likewise have a low non-linear refractive index, i.e. the glasses, even without incorporated activator ions, have great significance in the construction of laser amplifier chains.

It is known, e.g. from German Pat. Nos. 1,171,082 and 1,255,215, to produce laser materials based on silicate glasses, which provide a good fluorescence life for the $Nd^3$ ions (up to 1000 microseconds). Such silicate glasses can be produced in optically homogeneous form in large volume and the number of absorbent particles in the glass can be kept small. The disadvantage of such glasses is their relatively high non-linear refractive index and the corresponding limited effective cross-section of induced emission.

It is also known according to U.S. Pat. Nos. 3,250,721, 3,846,142, and French Pat. No. 2,291,949, to produce laser glasses based on phosphate glasses. These glasses have large effective cross-sections of induced emission, they can also be produced with good optical homogeneity in large volume and their content of absorbent particles is low. However, the fluorescence life is restricted to approximately 300 microseconds and the non-linear refractive index cannot be reduced below $1 \times 10^{-13}$ esu. Due to their relatively high optical refraction, said phosphate glasses do not have the desired low non-linear refractive index $n_2$.

It is known that glasses display a reduction of the non-linear refractive index $n_2$ with decreasing color dispersion and refractive power. This is the case with the group of fluorine phosphate glasses. High-fluoride glasses are required even for glasses with $n_2 < 0.8$. Such glasses are known, e.g. see German Pat. Nos. 945,408 and 1,596,877; British Pat. No. 1,405,717; and commercially available glass type FK 51, Schott Catalog 3060/72. Such glasses contain primarily fluorides and phosphoric acid and have a far stronger tendency to crystallization and segregation than conventional silicate, borosilicate, silicoborate and borate glasses. As these known glasses display no laser properties, it is necessary to use for this purpose special laser activator elements from the rare earth group, e.g. Nd.

OBJECTS OF THE INVENTION

Accordingly, it is a general object of the present invention to provide new glass compositions which exhibit both a good laser effect and simultaneously a low non-linear refractive index $n_2$.

Another object of this invention is to provide such glasses which furthermore contain substantially no laser absorbent particles which would lead to destruction of the glass due to absorption when powerful laser impulses pass through it.

An additional object of this inventions to provide such glasses which are suitable for laser amplifier applications and capable of being produced in large volumes with extremely high optical quality.

Other objects of this invention will become more fully apparent to those skilled in the art from the following description thereof.

SUMMARY OF THE INVENTION

Briefly, the above and other objects, features and advantages of the present invention are attained in one aspect thereof by providing glass compositions which permit the introduction of laser activators into fluorophosphate glass with exceptionally high fluorine content while forming glasses of high crystallization stability and permitting the realization of large melt volumes. The high fluorine content imparts to the glasses an exceptionally low non-linear refractive index $n_2$ down to $0.4 \times 10^{-13}$ esu.

In another aspect of the present invention, partial or total replacement of $P_2O_5$ by $As_2O_5$ in specific ranges of the glass compositions has a further crystallization stabilizing effect without appreciably influencing the $n_2$ values.

BRIEF DESCRIPTION OF THE DRAWING

The present invention will become more fully apparent to those skilled in the art to which this invention pertains from the following Detailed Discussion, taken in conjunction with the annexed drawing wherein the single FIGURE illustrates the relationship, for a given index of refraction, between the Abbe number and the non-linear refractive index for selected glass compositions according to the present invention.

DETAILED DISCUSSION

The inclusion of $Nd_2O_3$ or $NdF_3$ in known fluorophosphate glasses (such as FK 51) causes a marked increase in the tendency to crystallization. However, it has now been unexpectedly discovered that there are specific glass composition ranges which permit the introduction of such laser activators into the glass while forming glasses of high crystallization stability and which permit the realization of melts of unexpectedly large melt volumes (e.g. 20 liters). It appears as if the Nd actually exercises a stabilizer function—referred to the glass formation—in the case of these special compositions, as do also e.g. lanthanum, yttrium, ytterbium, gadolinium and cerium as oxides or fluorides; gallium and indium behave similarly.

It has further been discovered that the partial or total replacement of $P_2O_5$ by $As_2O_5$ in specific ranges of the glass composition has a crystallization-stabilising effect without appreciably influencing the $n_2$ values.

The glasses of the present invention can be subdivided into three groups with regard to their optical position.

The glasses according to the invention in the optical position range I:
nd = 1.40–1.44,
vd = 94–86,
having a low non-linear refractive index
$n_2$ = <0.60,
preferably comprise:
$P_2O_5$: 0–12 wt. %
$As_2O_5$: 0–12 wt. %
$P_2O_5 + As_2O_5$: 6–12 wt. %
Alkali metal oxides: 3–15 wt. %
MgO: 0–6 wt. %
CaO: 22–26 wt. %
SrO: 0–12 wt. %
BaO: 0–11 wt. %
$Al_2O_3$: 18–21 wt. %
$Nd_2O_3$: 0–6 wt. %
MgO + CaO: 26–30 wt. %
SrO + BaO: 5–11 wt. %
$F_2$-O: 27–30 wt. %

The glasses according to the invention in the optical position range II:
nd = 1.44–1.465,
vd = 90–85,
having a low non-linear refraction index
$n_2$ = 0.55–0.65,
preferably comprise:
$P_2O_5$: 0–12 wt. %
$As_2O_5$: 0–12 wt. %
$P_2O_5 + As_2O_5$: 6–15 wt. %
Alkali metal oxides: 1–8 wt. %
MgO: 0–5 wt. %
CaO: 11–25 wt. %
SrO: 0–22 wt. %
BaO: 0–12 wt. %
$Al_2O_3$: 15–20 wt. %
$Nd_2O_3$: 0–6 wt. %
MgO + CaO: 11–27 wt. %
SrO + BaO: 10–30 wt. %
$F_2$-O: 24–30 wt. %

The glasses according to the invention in the optical position range III:
nd = 1.46–1.475,
vd = 88–83,
having a low non-linear refractive index
$n_2$ = 0.60–0.70,
preferably comprise:
$P_2O_5$: 0–15 wt. %
$As_2O_5$: 0.6–12 wt. %
$P_2O_5 + As_2O_5$: 6–15 wt. %
Alkali metal oxides: 0–5 wt. %
MgO: 0–7 wt. %
CaO: 8–15 wt. %
SrO: 18–22 wt. %
BaO: 10–17 wt. %
$Al_2O_3$: 14–16 wt. %
$Nd_2O_3$: 0–6 wt. %
MgO + CaO: 11–20 wt. %
SrO + BaO: 28–38 wt. %
$F_2$-O: 20–24 wt. %

The predominant part (over 50% and preferably over 70%) of the components in the composition is used as metal fluoride. The phosphoric acid is introduced as $P_2O_5$ or in the form of metal phosphates or complex alkali or alkali earth phosphorofluorides. The arsenic oxide is introduced as $As_2O_5$ or in the form of arsenates. Because a reciprocal exchange of the fluoride or phosphate anions, with reference to a specific cation, is in principle possible among the melt components, there is little point in expressing the composition according to the invention as metal fluorides and metal phosphates. The form of the oxidic terms has therefore been chosen in order to express the composition with the necessary clarity. The fluorine component, formally represented by $F_2$-O, thus represents the fluoride fraction reduced by the weight fraction of the oxygen which is fixed as oxide. With this customary mode of representation, different types of compositions can easily be compared among themselves by conversion to the corresponding oxides without regard to the large number of chemical compounds which may be used as batch constituents. This mode of representation is justified by the fact that no specific association between cation and anion in the glass can be determined or detected in practice. A chemical analysis of said glasses, which is customarily referred to cation oxides, conforms to the composition ranges indicated.

However, in order to show in what form the constituents of the glass batch may be inserted into the melting crucible, all examples are shown hereinbelow, not only in their basic composition stated in oxides, but also in the form of the compounds used (in wt. %). As previously indicated, it is generally possible to choose different raw components for the same composition of the molten glass. The specific selection of quantities and combinations of the melt components are of substantial importance for the compositions according to the invention.

As is known, BaO has a considerable crystallization stabilizing effect upon fluorophosphate glasses with high nd-vd values. Consequently, glasses of this type are known only with BaO contents above 12 wt. %. It has been unexpectedly discovered that, with the compositions according to the invention, even BaO fractions below 12 wt. %, and indeed even BaO-free compositions, yield crystallization stable glasses. It was hitherto unknown that glasses with nd values less than 1.45 could be obtained in crystallization stable form without BeF$_2$, and that glasses with an optical refraction nd$\leq$1.43 could be obtained at all, as is now the case with the glasses according to the invention. It has been found that particularly valuable compositions as regards desirably low n$_2$ values are obtained by high CaO contents above 22 wt. %.

As a further means of stabilizing against crystallization and segregation, supplements of lanthanum, yttrium, gadolinium, gallium, cerium, indium and tungsten as oxides or fluorides in small quantities up to approximately 3 wt. %, tantalum and niobium up to approximately 2 wt. %, and also bromides, chlorides and sulphates up to approximately 2 wt. % instead of fluoride may be introduced. Zirconium and titanium can be introduced up to approximately 2 wt. % as ZrF$_4$ or K$_2$TiF$_6$.

The glasses according to the invention, like the known fluorophosphate glasses, possess intensified anomalous partial dispersion and negative temperature coefficients of the refractive index.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight The method of producing the glasses of Examples 1 thru 29, the compositions and physical properties of which are known in Tables 1 and 2, is explained more fully hereinbelow:

The batches of e.g. the following three examples (3, 8 and 11) are thoroughly mixed and melted in a Pt crucible at approximately 900°–1000° C., then refined in a closed furnace system at approximately 1050°–1100° C. and stirred to a pouring viscosity of approximately 20 poise, poured into preheated moulds and cooled from transformation temperature at a speed of 1°–10° C. per hour in the cooling furnace.

A selection of the compositions according to the invention will be found in oxides (wt. %) in Table 1 and in corresponding compounds in fluorides, phosphates, as already mentioned in Table 2. The single drawing shows the dependence of the n$_2$ values upon the refraction nd and the dispersion vd for the examples selected.

TABLE 1

| Wt. - % Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Oxide | | | | | | | | | | | | | | |
| P$_2$O$_5$ | 8.44 | 8.90 | 8.98 | 4.5 | 4.5 | 4.5 | 10.19 | 7.95 | 9.70 | 11.30 | 10.66 | 11.40 | 9.4 | 6.85 |
| As$_2$O$_5$ | — | — | — | 4.5 | 4.5 | 4.5 | — | 2.25 | — | — | 0.6 | 0.6 | 1.7 | 4.41 |
| Li$_2$O | — | — | — | — | — | — | — | — | — | — | — | — | 1.64 | — |
| Na$_2$O | 6.07 | 4.00 | 4.06 | 4.06 | 4.06 | 4.06 | 5.03 | 2.03 | 1.99 | 1.92 | 0.49 | — | — | 0.49 |
| K$_2$O | 4.58 | 2.76 | 2.92 | 0.81 | 0.41 | 0.41 | 1.35 | 0.20 | — | — | — | — | — | — |
| MgO | 3.98 | 3.88 | 4.23 | 3.88 | 3.88 | 3.88 | 3.97 | 3.82 | 4.21 | 4.21 | 4.27 | 3.72 | 4.12 | 4.23 |
| CaO | 22.13 | 23.13 | 22.71 | 23.34 | 23.70 | 25.14 | 18.55 | 19.83 | 14.29 | 14.36 | 14.39 | 14.55 | 9.53 | 14.39 |
| SrO | 5.08 | 7.34 | 7.63 | 11.14 | 10.72 | — | 12.92 | 9.12 | 17.90 | 16.50 | 18.01 | 18.23 | 21.53 | 18.02 |
| BaO | — | — | — | — | — | 9.62 | 3.16 | 10.98 | 10.67 | 10.67 | 10.70 | 12.35 | 15.90 | 10.71 |
| Al$_2$O$_3$ | 18.70 | 19.55 | 19.34 | 19.73 | 20.03 | 20.03 | 16.69 | 17.07 | 15.24 | 15.30 | 15.30 | 14.11 | 14.17 | 15.33 |
| La$_2$O$_3$ | — | — | — | — | — | — | — | 0.37 | — | — | — | 0.79 | 0.76 | — |
| Nd$_2$O$_3$ | 2.58 | 2.50 | 2.52 | — | — | — | 2.35 | 1.10 | 2.20 | 2.20 | 2.16 | 2.18 | — | 2.16 |
| F$_2$—O | 28.44 | 27.94 | 27.61 | 28.04 | 28.20 | 27.86 | 25.79 | 25.28 | 23.80 | 23.54 | 23.42 | 22.67 | 21.25 | 23.41 |
| $\Sigma$Wt. - % | 100.00 | 100.00 | 100.00 | 100.00 | 100.00 | 100.00 | 100.00 | 100.00 | 100.00 | 100.00 | 100.00 | 100.00 | 100.00 | 100.00 |
| P$_2$O$_5$ + $\Sigma_{As_2O_5}$ | 8.44 | 8.90 | 8.98 | 9.00 | 9.00 | 9.00 | 10.19 | 10.20 | 9.70 | 11.30 | 11.26 | 11.40 | 11.10 | 11.26 |
| $\Sigma$MgO + CaO | 26.11 | 27.01 | 26.94 | 27.22 | 27.58 | 29.02 | 22.52 | 23.65 | 18.50 | 18.57 | 18.66 | 18.27 | 13.65 | 18.62 |
| $\Sigma$SrO + BaO | 5.08 | 7.34 | 7.63 | 11.14 | 10.72 | 9.62 | 16.08 | 20.10 | 28.57 | 27.17 | 28.71 | 30.58 | 37.43 | 28.73 |
| nd | 1.4089 | 1.4297 | 1.430 | 1.4345 | 1.4335 | 1.4378 | 1.4526 | 1.4590 | 1.4639 | 1.4683 | 1.4683 | 1.4745 | 1.4745 | 1.4683 |
| vd | 92.8 | 90.2 | 90.8 | 87.2 | 88.7 | 87.5 | 88.5 | 88.0 | 88.1 | 87.1 | 86.8 | 85.8 | 85.1 | 84.2 |
| n$_2$ | 0.460 | 0.516 | 0.513 | 0.553 | 0.537 | 0.557 | 0.554 | 0.581 | 0.593 | 0.613 | 0.625 | 0.647 | 0.658 | 0.655 |

| Wt. - % Example | 15 | 16 | 17 | 18 | 19 | 20 | 21 | 22 | 23 | 24 | 25 |
|---|---|---|---|---|---|---|---|---|---|---|---|
| Oxide | | | | | | | | | | | |
| P$_2$O$_5$ | 9.10 | 9.10 | 9.10 | 9.0 | 9.0 | 10.78 | 10.78 | 10.78 | 10.78 | 10.49 | 8.4 |
| As$_2$O$_5$ | — | — | — | — | — | 0.6 | 0.6 | 0.6 | 0.6 | 0.6 | 0.6 |
| Li$_2$O | — | 3.23 | — | — | — | — | — | — | — | — | — |
| Na$_2$O | 3.68 | — | 3.48 | 4.06 | 4.06 | — | — | — | — | — | 4.06 |
| K$_2$O | 2.03 | 1.21 | 2.03 | 0.81 | 1.23 | — | — | — | — | — | 0.81 |
| Cs$_2$O | — | — | — | 1.50 | — | — | — | — | — | — | — |
| MgO | 3.95 | 3.95 | 3.95 | 3.88 | 3.88 | 3.72 | 3.72 | 3.72 | 3.72 | 3.62 | 3.88 |
| CaO | 23.56 | 23.63 | 23.63 | 23.34 | 23.34 | 14.54 | 14.54 | 14.54 | 14.54 | 14.16 | 23.34 |
| SrO | 7.51 | 7.51 | 7.51 | 7.42 | 7.42 | 18.21 | 18.21 | 18.21 | 18.21 | 17.73 | 7.42 |
| BaO | — | — | — | — | — | 12.38 | 12.38 | 12.38 | 12.38 | 12.04 | — |
| Al$_2$O$_3$ | 19.91 | 19.97 | 19.97 | 19.73 | 19.73 | 14.10 | 14.10 | 14.10 | 14.10 | 13.72 | 19.73 |
| La$_2$O$_3$ | — | — | — | — | — | 0.79 | 0.79 | 0.79 | 0.79 | 0.77 | — |
| Nd$_2$O$_3$ | 2.50 | 2.50 | 2.50 | 2.50 | 2.50 | — | — | — | — | — | 2.50 |
| Ga$_2$O$_3$ | — | — | — | — | — | — | — | — | — | — | — |
| In$_2$O$_3$ | — | — | — | — | — | 2.20 | — | — | — | — | — |
| Y$_2$O$_3$ | — | — | — | — | — | — | 2.20 | — | — | — | — |
| Ce$_2$O$_3$ | — | — | — | — | — | — | — | 2.20 | — | — | — |
| Gd$_2$O$_3$ | — | — | — | — | — | — | — | — | 2.20 | 4.82 | — |
| ZrO$_2$ | — | — | — | — | — | — | — | — | — | — | 1.11 |
| TiO$_2$ | — | — | — | — | — | — | — | — | — | — | — |
| Ta$_2$O$_5$ | — | — | — | — | 0.79 | — | — | — | — | — | — |
| Nb$_2$O$_3$ | — | — | — | — | — | — | — | — | — | — | — |
| WO$_3$ | — | — | — | — | — | — | — | — | — | — | — |

TABLE 1-continued

| | | | | | | | | | | | |
|---|---|---|---|---|---|---|---|---|---|---|---|
| $F_2-O$ | 27.76 | 28.90 | 27.83 | 27.76 | 28.05 | 22.68 | 22.68 | 22.68 | 22.68 | 22.05 | 28.15 |
| ΣWt.-% | 100.00 | 100.00 | 100.00 | 100.00 | 100.00 | 100.00 | 100.00 | 100.00 | 100.00 | 100.00 | 100.00 |
| $P_2O_5 + \Sigma As_2O_5$ | 9.10 | 9.10 | 9.10 | 9.00 | 9.00 | 11.38 | 11.38 | 11.38 | 11.38 | 11.09 | 9.00 |
| ΣMgO + CaO | 27.51 | 27.58 | 27.58 | 27.22 | 27.22 | 18.26 | 18.26 | 18.26 | 18.26 | 17.78 | 27.22 |
| ΣSrO + BaO | 7.51 | 7.51 | 7.51 | 7.42 | 7.42 | 30.59 | 30.59 | 30.59 | 30.59 | 29.77 | 7.42 |
| Other | | | | | | | | | | | |
| Cl | 1.20 | — | — | — | — | — | — | — | — | — | — |
| Br | — | 1.40 | — | — | — | — | — | — | — | — | — |
| $SO_3$ | — | — | 1.4 | — | — | — | — | — | — | — | — |
| $n_d$ | 1.4378 | 1.4342 | 1.4356 | 1.4337 | 1.4357 | 1.4712 | 1.4715 | 1.4720 | 1.4717 | 1.4763 | 1.4352 |
| $v_d$ | 88.80 | 89.34 | 89.42 | 88.80 | 85.90 | 85.70 | 85.90 | 85.30 | 84.90 | 84.90 | 89.47 |
| $n_2$ | 0.545 | 0.533 | 0.535 | 0.537 | 0.568 | 0.644 | 0.642 | 0.650 | 0.654 | 0.664 | 0.534 |

| Wt.-% Example | 26 | 27 | 28 | 29 |
|---|---|---|---|---|
| Oxide | | | | |
| $P_2O_5$ | 11.36 | 10.70 | 10.78 | 10.78 |
| $As_2O_5$ | — | 0.6 | 0.6 | 0.6 |
| $Li_2O$ | — | — | — | — |
| $Na_2O$ | — | — | — | — |
| $K_2O$ | 0.86 | — | — | — |
| $Cs_2O$ | — | — | — | — |
| MgO | 3.71 | 3.72 | 3.72 | 3.72 |
| CaO | 14.52 | 14.54 | 14.54 | 14.54 |
| SrO | 18.18 | 18.21 | 18.21 | 18.21 |
| BaO | 12.32 | 12.38 | 12.38 | 12.38 |
| $Al_2O_3$ | 14.22 | 14.10 | 14.10 | 14.10 |
| $La_2O_3$ | 0.79 | 0.79 | 0.79 | 0.79 |
| $Nd_2O_3$ | — | — | — | — |
| $Ga_2O_3$ | — | — | — | — |
| $In_2O_3$ | — | — | — | — |
| $Y_2O_3$ | — | — | — | — |
| $Ce_2O_3$ | — | — | — | — |
| $Gd_2O_3$ | — | — | — | — |
| $ZrO_2$ | — | — | — | — |
| $TiO_2$ | 0.72 | — | — | — |
| $Ta_2O_5$ | — | 2.20 | — | — |
| $Nb_2O_5$ | — | — | 2.20 | — |
| $WO_3$ | — | — | — | 2.20 |
| $F_2-O$ | 23.32 | 22.68 | 22.68 | 22.68 |
| ΣWt.-% | 100.00 | 100.00 | 100.00 | 100.00 |
| $P_2O_5 + \Sigma As_2O_5$ | 11.36 | 11.38 | 11.38 | 11.38 |
| ΣMgO + CaO | 18.23 | 18.26 | 18.26 | 18.26 |
| ΣSrO + BaO | 30.50 | 30.59 | 30.59 | 30.59 |
| Other | | | | |
| Cl | — | — | — | — |
| Br | — | — | — | — |
| $SO_3$ | — | — | — | — |
| $n_d$ | 1.4687 | 1.4738 | 1.4747 | 1.4721 |
| $v_d$ | 85.40 | 83.20 | 83.10 | 84.50 |
| $n_2$ | 0.642 | 0.679 | 0.682 | 0.659 |

TABLE 2

| Wt.-% Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Oxide | | | | | | | | | | | | | | |
| $P_2O_5$ | 4.0 | 8.9 | 8.9 | 4.5 | 4.5 | 4.5 | 10.2 | 7.9 | 9.7 | 11.3 | 10.7 | 10.8 | 9.4 | 6.9 |
| $As_2O_5$ | — | — | — | 4.5 | 4.5 | 4.5 | — | 2.2 | — | — | 0.6 | 0.6 | 1.7 | 4.4 |
| $P_2O_5 + As_2O_5$ | — | — | — | 9.0 | 9.0 | 9.0 | — | 10.1 | — | — | 11.3 | 11.4 | 11.1 | 11.3 |
| LiF | — | — | — | — | — | — | — | — | — | — | — | — | 2.9 | — |
| NaF | 5.5 | 5.4 | 5.5 | 5.5 | 5.5 | 5.5 | 6.8 | 2.8 | 2.7 | 2.6 | 0.7 | — | — | 0.7 |
| $NaPF_6$ | 10.0 | — | — | — | — | — | — | — | — | — | — | — | — | — |
| KF | 5.5 | 3.4 | 1.6 | 1.0 | 0.5 | 0.5 | 1.7 | 0.3 | — | — | — | — | — | — |
| $K_2O$ | — | — | 2.3 | — | — | — | — | — | — | — | — | — | — | — |
| $MgF_2$ | 6.0 | 6.0 | 6.5 | 6.0 | 6.0 | 6.0 | 6.1 | 5.9 | 6.5 | 6.5 | 6.6 | 6.5 | 5.8 | 6.5 |
| $CaF_2$ | 30.0 | 32.2 | 31.4 | 32.5 | 33.0 | 35.0 | 25.8 | 27.6 | 19.9 | 20.0 | 20.0 | 20.2 | 5.7 | 20.0 |
| CaO | — | — | — | — | — | — | — | — | — | — | — | — | 5.4 | — |
| $SrF_2$ | 6.0 | 8.9 | 9.2 | 13.5 | 13.0 | — | 15.7 | 11.1 | 21.7 | 20.0 | 21.8 | 22.1 | 26.0 | 21.9 |
| $BaF_2$ | — | — | — | — | — | 11.0 | 3.6 | 12.6 | 12.2 | 12.2 | 12.2 | 14.1 | 18.2 | 12.2 |
| $AlF_3$ | 30.0 | 32.2 | 31.6 | 32.5 | 33.0 | 33.0 | 27.5 | 28.1 | 25.1 | 25.2 | 25.2 | 23.2 | 23.4 | 25.2 |
| $LaF_3$ | — | — | — | — | — | — | — | 0.4 | — | — | — | 0.9 | 0.9 | — |
| $Nd_2O_3$ | — | — | — | — | — | — | 1.1 | 1.1 | 2.2 | 2.2 | 2.2 | 2.2 | — | 2.2 |
| $NdF_3$ | 3.0 | 3.0 | 3.0 | — | — | — | 1.5 | — | — | — | — | — | — | — |
| $n_d$ | 1.4089 | 1.4297 | 1.430 | 1.4345 | 1.4335 | 1.4378 | 1.4409 | 1.4526 | 1.4590 | 1.4639 | 1.4683 | 1.4733 | 1.4745 | 1.4683 |
| $v_d$ | 92.8 | 90.2 | 90.8 | 87.2 | 88.7 | 87.5 | 88.5 | 88.0 | 88.1 | 87.1 | 86.8 | 85.8 | 85.1 | 84.2 |
| $n_2$ | 0.460 | 0.517 | 0.513 | 0.553 | 0.537 | 0.557 | 0.554 | 0.581 | 0.593 | 0.613 | 0.625 | 0.647 | 0.658 | 0.655 |

TABLE 2-continued

| Wt. -% Example | 15 | 16 | 17 | 18 | 19 | 20 | 21 |
|---|---|---|---|---|---|---|---|
| Oxide | | | | | | | |
| $P_2O_5$ | 9.0 | 9.0 | 9.0 | 9.0 | 9.0 | 10.8 | 10.8 |
| $As_2O_5$ | — | — | — | — | — | 0.6 | 0.6 |
| $P_2O_5 + As_2O_5$ | 9.0 | 9.0 | 9.0 | 9.0 | 9.0 | 11.4 | 11.4 |
| NaF | 3.5 | 5.5 | 3.5 | 5.5 | 5.5 | — | — |
| NaCl | 2.0 | — | — | — | — | — | — |
| $Na_2SO_4$ | — | — | 2.0 | — | — | — | — |
| KF | 2.5 | 0.5 | 2.5 | 1.0 | 1.0 | — | — |
| KBr | — | 2.0 | — | — | — | — | — |
| $Cs_2O$ | — | — | — | 1.5 | — | — | — |
| $MgF_2$ | 6.0 | 6.0 | 6.0 | 6.0 | 6.0 | 5.7 | 5.7 |
| $CaF_2$ | 32.5 | 32.5 | 32.5 | 32.5 | 32.5 | 20.3 | 20.3 |
| $SrF_2$ | 9.0 | 9.0 | 9.0 | 9.0 | 9.0 | 22.1 | 22.1 |
| $BaF_2$ | — | — | — | — | — | 14.2 | 14.2 |
| $ZrF_4$ | — | — | — | — | — | — | — |
| $K_2TiF_6$ | — | — | — | — | — | — | — |
| $K_2TaF_7$ | — | — | — | — | 1.5 | — | — |
| $AlF_3$ | 32.5 | 32.5 | 32.5 | 32.5 | 32.5 | 23.2 | 23.2 |
| $LaF_3$ | — | — | — | — | — | 0.9 | 0.9 |
| $Y_2O_3$ | — | — | — | — | — | — | 2.2 |
| $YF_3$ | — | — | — | — | — | — | — |
| $Nd_2O_3$ | — | — | — | — | — | — | — |
| $NdF_3$ | 3.0 | 3.0 | 3.0 | 3.0 | 3.0 | — | — |
| $Gd_2O_3$ | — | — | — | — | — | — | — |
| $In_2O_3$ | — | — | — | — | — | 2.2 | — |
| $Ga_2O_3$ | — | — | — | — | — | — | — |
| $Ce_2O_3$ | — | — | — | — | — | — | — |
| $Ta_2O_5$ | — | — | — | — | — | — | — |
| $Nb_2O_5$ | — | — | — | — | — | — | — |
| $WO_3$ | — | — | — | — | — | — | — |
| $n_d$ | 1.4378 | 1.4342 | 1.4356 | 1.4337 | 1.4357 | 1.4712 | 1.4715 |
| $v_d$ | 88.80 | 89.34 | 89.42 | 88.80 | 85.90 | 85.70 | 85.90 |

| Wt. -% Example | 22 | 23 | 24 | 25 | 26 | 27 | 28 | 29 |
|---|---|---|---|---|---|---|---|---|
| Oxide | | | | | | | | |
| $P_2O_5$ | 10.8 | 10.8 | 10.1 | 8.4 | 11.4 | 10.8 | 10.8 | 10.8 |
| $As_2O_5$ | 0.6 | 0.6 | 0.6 | 0.6 | — | 0.6 | 0.6 | 0.6 |
| $P_2O_5 + As_2O_5$ | 11.4 | 11.4 | 11.1 | 9.0 | 11.4 | 11.4 | 11.4 | 11.4 |
| NaF | — | — | — | 5.5 | — | — | — | — |
| NaCl | — | — | — | — | — | — | — | — |
| $Na_2SO_4$ | — | — | — | — | — | — | — | — |
| KF | — | — | — | 1.0 | — | — | — | — |
| KBr | — | — | — | — | — | — | — | — |
| $Cs_2O$ | — | — | — | — | — | — | — | — |
| $MgF_2$ | 5.7 | 5.7 | 5.6 | 6.0 | 5.7 | 5.7 | 5.7 | 5.7 |
| $CaF_2$ | 20.3 | 20.3 | 19.7 | 32.5 | 20.2 | 20.3 | 20.3 | 20.3 |
| $SrF_2$ | 22.1 | 22.1 | 21.5 | 9.0 | 22.0 | 22.1 | 22.1 | 22.1 |
| $BaF_2$ | 14.2 | 14.2 | 13.8 | — | 14.1 | 14.2 | 14.2 | 14.2 |
| $ZrF_4$ | — | — | — | 1.5 | — | — | — | — |
| $K_2TiF_6$ | — | — | — | — | 2.2 | — | — | — |
| $K_2TaF_7$ | — | — | — | — | — | — | — | — |
| $AlF_3$ | 23.2 | 23.2 | 22.6 | 32.5 | 23.5 | 23.2 | 23.2 | 23.2 |
| $LaF_3$ | 0.9 | 0.9 | 0.9 | — | 0.9 | 0.9 | 0.9 | 0.9 |
| $Y_2O_3$ | — | — | — | — | — | — | — | — |
| $YF_3$ | — | — | — | — | — | — | — | — |
| $Nd_2O_3$ | — | — | — | — | — | — | — | — |
| $NdF_3$ | — | — | — | 3.0 | — | — | — | — |
| $Gd_2O_3$ | — | 2.2 | 4.8 | — | — | — | — | — |
| $In_2O_3$ | — | — | — | — | — | — | — | — |
| $Ga_2O_3$ | — | — | — | — | — | — | — | — |
| $Ce_2O_3$ | 2.2 | — | — | — | — | — | — | — |
| $Ta_2O_5$ | — | — | — | — | — | 2.2 | — | — |
| $Nb_2O_5$ | — | — | — | — | — | — | 2.2 | — |
| $WO_3$ | — | — | — | — | — | — | — | 2.2 |
| $n_d$ | 1.4720 | 1.4717 | 1.4763 | 1.4352 | 1.4687 | 1.4738 | 1.4747 | 1.4721 |
| $v_d$ | 85.30 | 84.90 | 84.90 | 89.47 | 85.40 | 83.20 | 83.10 | 84.50 |

Glass example 11 has a fluorescence life of 380 microseconds. This is a time of approximately the same value as the discharge time of xenon flash lamps, i.e. the fluorescence life is nicely adapted to the period of the laser excitation. The effective cross-section of the induced emission is $2.7 \times 10^{-20} cm^2$, which corresponds to the maximum value which can be obtained with silicate glasses. The glass is highly resistant with regard to laser beam impulses. The destruction threshold is 20–40 $J/cm^2$ for an impulse duration of 40 ns. The non-linear refractive index is $0.625 \times 10^{-13}$ esu, whereas the laser glasses hitherto known have values of around $1.5 \times 10^{-13}$ esu. The temperature coefficient of the refractive index is negative. The temperature coefficient of the optical wavelength $$(ds/dT) = (dn/dT) + (n-1)a$$

is very small: $-1.5 \times 10^{-6}/°C$. (n=refractive index, T=temperature, a=coeff. of therm expansion). The result of these properties is that the laser beam generated by the glass is not spread by the pump light when the temperature of the rod increases. Furthermore, the glass is chemically highly resistant.

EXAMPLE 3 of TABLE 1

| Oxides | Weight % | Mole % | Raw Component | Weigh-in per 8 kg calc. glass |
|---|---|---|---|---|
| Na$_2$O | 4.06 | 2.98 | NaF | 448.00 g |
| K$_2$O | 2.92 | 1.41 | K$_2$CO$_3$ | 342.40 g |
|  |  |  | KHF$_2$ | 214.93 g |
| MgO | 4.23 | 4.78 | MgF$_2$ | 523.20 g |
| CaO | 22.71 | 18.46 | CaF$_2$ | 2529.60 g |
| SrO | 7.63 | 3.36 | SrF$_2$ | 740.00 g |
| BaO | — | — | — | — |
| Al$_2$O$_3$ | 19.34 | 8.64 | AlF$_3$ | 2548.00 g |
| Nd$_2$O$_3$ | 2.52 | 0.34 | NdF$_3$ | 242.40 g |
| P$_2$O$_5$ | 8.98 | 2.88 | P$_2$O$_5$ | 718.40 g |
| F$_2$—O | 27.61 | 57.15 |  |  |
| MgO + CaO | 26.94 |  |  |  |
| SrO + BaO | 7.63 |  |  |  |
| nd | 1.430 |  |  |  |
| νd | 90.8 |  |  |  |
| n$_2$ | ca 0.513 |  |  |  |

EXAMPLE 8 of TABLE 1

| Oxides | Weight % | Mole % | Raw Component | Weigh-in per 8 kg calc. glass |
|---|---|---|---|---|
| Na$_2$O | 2.03 | 1.61 | NaF | 220.00 g |
| K$_2$O | 0.20 | 0.11 | KF | 20.00 g |
| MgO | 3.82 | 4.67 | MgF$_2$ | 472.00 g |
| CaO | 19.83 | 17.43 | CaF$_2$ | 2208.80 g |
| SrO | 9.12 | 4.34 | SrF$_2$ | 884.80 g |
| BaO | 10.98 | 3.53 | BaF$_2$ | 1004.80 g |
| Al$_2$O$_3$ | 17.07 | 8.25 | AlF$_3$ | 2249.60 g |
| La$_2$O$_3$ | 0.37 | 0.06 | LaF$_3$ | 35.20 g |
| Nd$_2$O$_3$ | 1.10 | 0.16 | NdF$_3$ | 88.00 g |
| P$_2$O$_5$ | 7.95 | 2.76 | P$_2$O$_5$ | 636.00 g |
| As$_2$O$_5$ | 2.25 | 0.48 | As$_2$O$_5$ | 180.00 g |
| F$_2$—O | 25.28 | 56.60 |  |  |
| MgO + CaO | 23.65 |  |  |  |
| SrO + BaO | 20.10 |  |  |  |
| P$_2$O$_5$ + As$_2$O$_5$ | 10.20 |  |  |  |
| nd | 1.4526 |  |  |  |
| νd | 88.0 |  |  |  |
| n$_2$ | 0.581 |  |  |  |

EXAMPLE 11 of TABLE 1

| Oxides | Weight % | Mole % | Raw Component | Weigh-in per 8 kg calc. glass |
|---|---|---|---|---|
| Na$_2$O | 0.49 | 0.42 | NaF | 56.00 g |
| MgO | 4.27 | 5.54 | MgF$_2$ | 528.00 g |
| CaO | 14.39 | 13.40 | CaF$_2$ | 1600.00 g |
| SrO | 18.01 | 9.09 | SrF$_2$ | 1744.00 g |
| BaO | 10.70 | 3.65 | BaF$_2$ | 976.00 g |
| Al$_2$O$_3$ | 15.30 | 7.85 | AlF$_3$ | 2016.00 g |
| Nd$_2$O$_3$ | 2.16 | 0.34 | Nd$_2$O$_3$ | 173.00 g |
| P$_2$O$_5$ | 10.66 | 3.93 | P$_2$O$_5$ | 856.00 g |
| As$_2$O$_5$ | 0.60 | 0.14 | As$_2$O$_5$ | 48.00 g |
| F$_2$—O | 23.42 | 55.65 |  |  |
| MgO + CaO | 18.66 |  |  |  |
| SrO + BaO | 28.71 |  |  |  |
| P$_2$O$_5$ + As$_2$O$_5$ | 11.26 |  |  |  |
| nd | 1.4683 |  |  |  |

EXAMPLE 11 of TABLE 1-continued

| Oxides | Weight % | Mole % | Raw Component | Weigh-in per 8 kg calc. glass |
|---|---|---|---|---|
| νd | 86.8 |  |  |  |
| n$_2$ | 0.625 |  |  |  |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. Glasses suitable for laser applications having a low non-linear refractive index $n_2 < 0.60$ in the optical position range
   nd = 1.40–1.44
   νd = 94–86
which consist essentially of the following components, expressed as oxides in weight percent:
   P$_2$O$_5$: 4.5–9.10
   As$_2$O$_5$: 0–4.5
   P$_2$O$_5$+As$_2$O$_5$: 8.44–9.10
   alkali metal oxides: 4.44–10.65
   MgO: 3.88–4.23
   CaO: 22.13–25.14
   MgO+CaO: 26.11–29.02
   SrO: 0–11.14
   BaO: 0–9.62
   SrO+BaO: 5.08–11.14
   Al$_2$O$_3$: 18.70–20.03
   Nd$_2$O$_3$: 0–2.58 F$_2$-O: 27.61–28.90.

2. A glass composition according to claim 1, having a non-linear refractive index $n_2 \sim 0.513$ in the optical position range nd ~ 1.430 and νd ~ 90.8, which comprises the following components, expressed as oxides in approximate weight percent:
   P$_2$O$_5$: 8.98
   Na$_2$O: 4.06
   K$_2$O: 2.92
   MgO: 4.23
   CaO: 22.71
   MgO+CaO: 26.94
   SrO: 7.63
   Al$_2$O$_3$: 19.34
   Nd$_2$O$_3$: 2.52
   F$_2$-O: 27.61.

3. Glasses suitable for laser applications having a low non-linear refractive index $n_2 = 0.55$–0.65 in the optical position range
   nd = 1.44–1.465
   νd = 90–85
which consist essentially of the following components, expressed as oxides in weight percent:
   P$_2$O$_5$: 7.95–11.30
   As$_2$O$_5$: 0–2.25
   P$_2$O$_5$+As$_2$O$_5$: 9.70–11.30
   alkali metal oxides: 1.92–6.38
   MgO: 3.82–4.21
   CaO: 14.29–19.83
   SrO: 9.12–17.90
   BaO: 3.16–10.98
   Al$_2$O$_3$: 15.24–17.07

Nd$_2$O$_3$: 1.10-2.35
MgO+CaO: 18.50-23.65
SrO+BaO: 16.08-28.57
F$_2$-O: 23.54-25.79.

4. A glass composition according to claim 3, having a non-linear refractive index n$_2 \sim$0.581 in the optical position range nd$\sim$1.4526 and νd$\sim$88.0, which comprises the following components, expressed as oxides in approximate weight percent:
P$_2$O$_5$: 7.95
As$_2$O$_5$: 2.25
Na$_2$O: 2.03
K$_2$O: 0.20
MgO: 3.82
CaO: 19.83
SrO: 9.12
BaO: 10.98
Al$_2$O$_3$: 17.07
La$_2$O$_3$: 0.37
Nd$_2$O$_3$: 1.10
F$_2$-O: 25.28.

5. Glasses suitable for laser applications having a low non-linear refractive index n$_2$=0.60-0.70 in the optical position range
nd=1.46-1.475
νd=88-83
which consist essentially of the following components, expressed as oxides in weight percent:

P$_2$O$_5$: 6.85-11.40
As$_2$O$_5$: 0-4.41
P$_2$O$_5$+As$_2$O$_5$: 11.09-11.40
alkali metal oxides: 0-1.64
MgO: 3.62-4.27
CaO: 9.53-14.55
SrO: 17.73-21.53
BaO: 10.70-15.90
Al$_2$O$_3$: 13.72-15.33
Nd$_2$O$_3$: 0-2.18
MgO+CaO: 13.65-18.66
SrO+BaO: 28.71-37.43
F$_2$-O: 21.25-23.42.

6. A glass composition according to claim 5, having a non-linear refractive index n$_2 \sim$0.625 in the optical position range nd$\sim$1.4683 and νd$\sim$86.8, which comprises the following components, expressed as oxides in approximate weight percent:
P$_2$O$_5$: 10.66
As$_2$O$_5$: 0.60
Na$_2$O: 0.49
MgO: 4.27
CaO: 14.39
SrO: 18.01
BaO: 10.70
Al$_2$O$_3$: 15.30
Nd$_2$O$_3$: 2.16
F$_2$-O: 23.42.

* * * * *